United States Patent Office 2,781,394
Patented Feb. 12, 1957

2,781,394

6-HYDROXYACYL-1,4a-DIMETHYL-7-ISOPROPYL-1,2,3,4,4a,9,10,10a - OCTAHYDROPHENANTHRENE-1-CARBONITRILES AND ESTERS THEREOF

Willard M. Hoehn, Wilmette, Ill., assignor to G. D. Searle & Co., Chicago, Ill., a corporation of Illinois No Drawing. Application March 14, 1955, Serial No. 494,235

6 Claims. (Cl. 260—464)

The present invention relates to a new class of phenanthrene carbonitriles, and specifically concerned with hydroxyacyl and acyloxyacyl substitution products of 1,4a-dimethyl-7-isopropyl - 1,2,3,4,4a,9,10,10a-octahydrophenanthrene-1-carbonitrile. The compounds of this invention can be represented by the structural formula

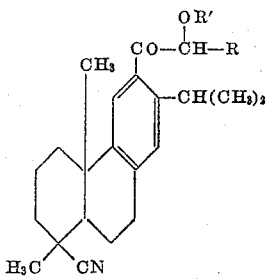

wherein R is a member of the group consisting of hydrogen and lower alkyl radicals and R' is a member of the group consisting of hydrogen and acyl radicals derived from lower alkanoic acids containing fewer than 9 carbon atoms. When R is a lower alkyl radical in the foregoing structural formula, it can represent methyl, ethyl, propyl, butyl, amyl, hexyl, and branched-chain isomers thereof. When R' is an acyl radical in the foregoing structural formula, it can represent such groups as formyl, acetyl, propionyl, butyryl, valeryl, hexanoyl, heptanoyl, octanoyl, and branched-chain isomers thereof, said groups being acyl radicals of lower alkanoic acids containing fewer than 9 carbon atoms.

A satisfactory starting material for the manufacture of the compounds of this invention is the dehydrogenated rosin nitrile prepared by reacting dehydrogenated rosin with ammonia at an elevated temperature and removing the water from the reaction mixture as it is formed, for example according to the processes disclosed in U. S. 2,534,297 to Putnam. The product obtained from dehydrogenated rosin by the methods of the aforementioned patent is crude dehydroabietonitrile, which can be crystallized to give purified dehydroabietonitrile, or 1,4a-dimethyl - 7-isopropyl - 1,2,3,4,4a,9,10,10a-octahydrophenanthrene-1-carbonitrile, as disclosed therein.

1,4a-dimethyl - 7 - isopropyl-1,2,3,4,4a,9,10,10a-octahydrophenanthrene-1-carbonitrile (dehydroabietonitrile) undergoes Friedel-Crafts reactions with acyl halides to yield 6-acyl substitution products. For example, the aluminum chloride-catalyzed reaction of 1,4a-dimethyl-7-isopropyl-1,2,3,4,4a,9,10,10a-octahydrophenanthrene- 1-carbonitrile with acetyl chloride affords 1,4a-dimethyl-6-acetyl-7-isopropyl - 1,2,3,4,4a,9,10,10a-octahydrophenanthrene-1-carbonitrile. Other 6-acyl substitution products are conveniently obtained by replacement of the acetyl chloride with the appropriate acyl chloride or bromide, the reaction with butyryl chloride, for example, yielding the 6-butyryl substitution product. These 6-acyl substitution products of 1,4a-dimethyl-7-isopropyl-1,2,3,4,4a,9,10,10a-octahydrophenanthrene-1-carbonitrile can be halogenated in the acyl substituent at the position alpha to the carbonyl group to yield halogenated derivatives having the structural formula

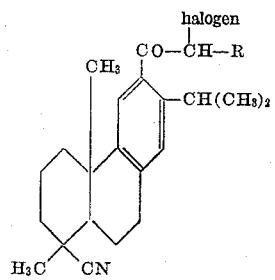

wherein R is defined as hereinbefore.

The same halogenated acyl derivatives can be prepared by an alternate route which requires only a single step from dehydroabietonitrile. This is achieved by conducting a Friedel-Crafts reaction of dehydroabietonitrile with a haloacyl halide such as chloroacetyl chloride, whereby the 6-haloacyl derivative results directly.

The preferred method of preparing iodinated derivatives such as 1,4a-dimethyl- 6-iodoacetyl- 7-isopropyl-1,2,3,4,4a,9,10,10a-octahydrophenanthrene- 1-carbonitrile consists of reacting the corresponding 6-chloroacetyl derivative with an alkali metal iodide in an acetone or butanone suspension.

The foregoing halogenated substitution products are useful cardiac depressants. They are also important intermediates in the synthesis of another class of therapeutic agents, the 6-acyloxyacyl and 6-hydroxyacyl derivatives of 1,4a-dimethyl- 7-isopropyl-1,2,3,4,4a,9,10,10a-octahydrophenanthrene-1-carbonitrile. Reaction of a 6-haloacyl substitution product with an alkali metal salt of a lower alkanoic acid affords the corresponding 6-acyloxyacyl derivative. Because of the relative unreactivity of the sterically-hindered nitrile group in these compounds, alkaline hydrolysis of the 6-acyloxyacyl derivatives conducted at room temperature yields the free ketols (that is, the 6-hydroxyacyl derivatives) without appreciable diminution of the yield from hydrolysis of the nitrile group.

The claimed 6-acyloxyacyl and 6-hydroxyacyl substitution products of 1,4a-dimethyl-7-isopropyl-1,2,3,4,4a,9,-10,10a-octahydrophenanthrene-1-carbonitrile are valuable in chemotherapeutics, as they are potent hypotensive agents. They also have anti-hormonal properties, and inhibit the masculinizing effects of testosterone.

This invention is disclosed in further detail by the following examples which are set forth for the purpose of illustrating the invention. However, the invention is not to be construed as limited in spirit or in scope by these examples as numerous modifications in methods, conditions and materials will be apparent to those skilled in the art. In each of these examples quantities of materials are given as parts by weight, temperatures in degrees centigrade (° C.), and pressures in millimeters of mercury (mm.).

*Example 1*

With efficient stirring, 95 parts of aluminum chloride is added to a solution of 100 parts of 1,4a-dimethyl-7-isopropyl - 1,2,3,4,4a,9,10,10a - octahydrophenanthrene - 1 - carbonitrile and 31 parts of acetyl chloride in 425 parts of nitrobenzene maintained at about −5 to +8° C. The reaction mixture is stirred for an additional 3 hours and kept under refrigeration for 2–3 days. The mixture is then poured on about 500 parts of ice, and sufficient ether is added to cause the density of the organic phase to become less than the density of the aqueous phase. The organic phase is separated and washed with a total of 600 parts of water in two portions, a total of 600 parts of 2% sodium hydroxide solution in two portions and then with several portions of water. The ethereal solution is dried over sodium sulfate, filtered, and concentrated on a steam bath and finally by a vacuum distillation at about 90–100° C. and a pressure of 15 mm. in order to remove the ether and nitrobenzene. A solution of the residue in chloroform is treated with activated charcoal, filtered and diluted with methanol. The precipitated product, 1,4a - dimethyl-6-acetyl-7-isopropyl - 1,2,3,4,4a,9,10,10a-octahydrophenanthrene-1-carbonitrile is collected on a filter. An additional quantity of this product is obtained by concentration of the mother liquor. This compound melts at 156–158° C. and has the following structural formula

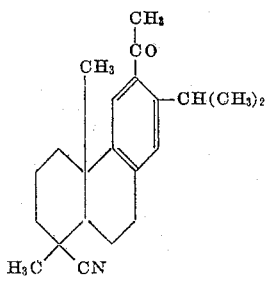

Example 2

A stirred solution of 8.65 parts of 1,4a-dimethyl-6-acetyl - 7 - isopropyl - 1,2,3,4,4a,9,10,10a - octahydro - phenanthrene-1-carbonitrile in 180 parts of ether is treated by the gradual addition of 4.5 parts of bromine. After about an hour the mixture is extracted with 200 parts of water. The ethereal layer is separated and washed with two portions of 100 parts each of 2% sodium hydroxide solution and then with several portions of water. All aqueous washings are discarded. The organic phase is dried over sodium sulfate, filtered, and concentrated in a vacuum. A solution of the residue in a small amount of ether is diluted with warm methanol and cooled, whereupon purified 1,4a-dimethyl-6-bromoacetyl-7-isopropyl-1,2,3,4,4a,9,10,10a - octahydrophenanthrene - 1 - carbo - nitrile separates from the solution. This product is collected on a filter and washed with methanol. It melts at about 103–104.5° C. and has the following structural formula

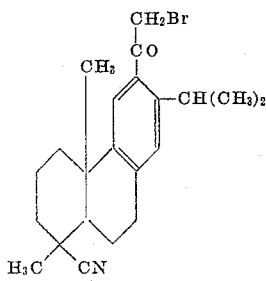

Example 3

Aluminum chloride (95 parts) is gradually added to a solution of 100 parts of 1,4a-dimethyl-7-isopropyl-1,2,3,4,4a,9,10,10a - octahydrophenanthrene - 1 - carbonitrile and 40.5 parts of chloroacetyl chloride in 725 parts of nitrobenzene. The reaction mixture is maintained at 0–3° C. and is stirred during the aluminum chloride addition and for 1 hour thereafter. The reaction vessel is protected from atmospheric moisture with a drying tube and is kept under refrigeration for 24 hours at about 5° C. The mixture is poured onto 600 parts of ice, and 1100 parts of ether is added. The mixture is stirred and then allowed to stand until the layers separate. The organic phase is washed with 1000 parts of water, then with 1000 parts of 2% sodium hydroxide solution and finally with a total of 2000 parts of water in two portions. All aqueous washings are discarded. The ethereal solution is dried over sodium sulfate, filtered and concentrated in a vacuum. The residue is dissolved by digesting it for 15 minutes with 130 parts of refluxing petroleum ether. The crystalline material obtained when this solution is allowed to cool and stand is recrystallized from a mixture of methanol and chloroform. This product is 1,4a - dimethyl - 6 - chloroacetyl - 7 - isopropyl - 1,2,3,4,4a,9,10,10a - octahydrophenanthrene - 1 - car - bonitrile of melting point 145–146° C. It has the following structural formula

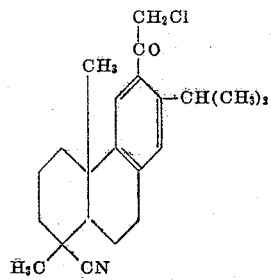

Example 4

A mixture of 40 parts of 1,4a-dimethyl-6-chloroacetyl-7-isopropyl-1,2,3,4,4a9,10,10a - octahydrophenanthrene-1-carbonitrile, 160 parts of acetone and 40 parts of sodium iodide is allowed to stand at room temperature for 24 hours with periodic shaking. The reaction mixture is then diluted with several times its volume of ether and washed with water, with 2 portions of 1% sodium thiosulfate solution and finally with several additional portions of water. The organic phase is dried over anhydrous sodium sulfate, filtered and concentrated to dryness, yielding a residue of 1,4a-dimethyl-6-iodoacetyl-7-isopropyl - 1,2,3,4,4a,9,10,10a - octahydrophenanthrene-1-carbonitrile. This compound has the following structural formula

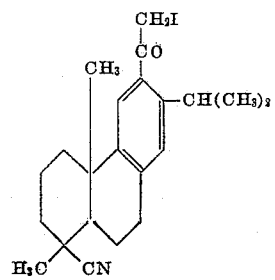

Example 5

A solution prepared from 7.2 parts of 1,4a-dimethyl-6-chloroacetyl -7 -isopropyl -1,2,3,4,4a,9,10,10a -octahydrophenanthrene-1-carbonitrile, 4 parts of sodium acetate, 36 parts of ethanol, 5 parts of water, and 1 part of glacial acetic acid is heated under reflux for 4 hours and allowed to stand at room temperature for 16 hours. The crystalline product is collected on a filter and washed with water. Recrystallization of this crude product from a mixture of methanol and water containing about 90 volume percent of methanol affords purified 1,4a - dimethyl - 6 - acetoxyacetyl-7- isopropyl- 1,2,3,4,4a,9,10,10a- octahydrophenanthrene-1-carbonitrile. This compound melts at 86–87° C. and has the following structural formula

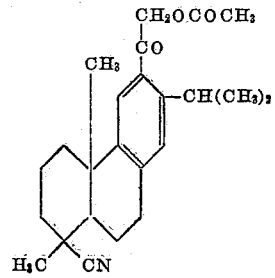

Example 6

A solution prepared by dissolving 7.3 parts of 1,4a-dimethyl -6- acetoxyacetyl -7- isopropyl -1,2,3,4,4a,9,10,-10a-octahydrophenanthrene-1-carbonitrile in 150 parts of warm methanol is cooled to room temperature and stirred with a solution of 1.3 parts of potassium hydroxide in 24 parts of methanol. The mixture is allowed to stand at room temperature for 5 minutes and is then treated within a period of an additional minute with 30 parts of water and with 8 parts of aqueous acetic acid containing 1.7 parts of acetic acid. The mixture is then diluted with several times its volume of water whereupon 1,4a-dimethyl -6-hydroxyacetyl -7-isopropyl -1,2,3,4,4a,9,10,10a-octahydrophenanthrene-1-carbonitrile precipitates from the solution. This product has the structural formula

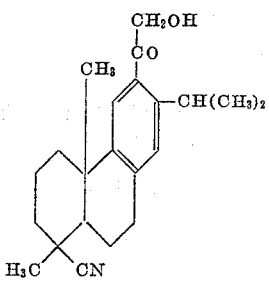

Example 7

Aluminum chloride (95 parts) is added to a stirred solution of 100 parts of 1,4a-dimethyl-7-isopropyl-1,2,3,4,4a,9,10,10a - octahydrophenanthrene - 1 - carbonitrile and 42 parts of butyryl chloride in 485 parts of nitrobenzene maintained in a cooling bath at about —5 to +5° C. The reaction mixture is stirred for an additional 3 hours and kept under refrigeration at about +5° C. for 3 days. It is poured on about 500 parts of ice and ether is added until the density of the organic phase becomes less than the density of the aqueous phase. Efficient mixing is employed during the addition of the ether. The organic phase is separated and washed successively with water, with 2% sodium hydroxide solution and finally with several portions of water. The ethereal solution is dried over sodium sulfate, filtered and concentrated on a steam bath and finally by a vacuum distillation at about 100% C. and a pressure of 15 mm. in order to remove the nitrobenzene and other volatile components. A solution of the residue in chloroform is decolorized with activated charcoal, filtered and diluted with methanol. The precipitated product, 1,4a-dimethyl-6-butyryl-7-isopropyl - 1,2,3,4,4a,9,10,10a - octahydrophenanthrene-1-carbonitrile is collected and washed. An additional quantity of this product is obtained by concentration of the mother liquor. This compound has the following structural formula

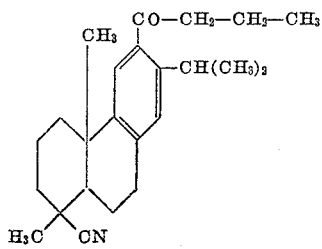

Example 8

A solution of 10 parts of 1,4a-dimethyl-6-butyryl-7-isopropyl - 1,2,3,4,4a,9,10,10a - octahydrophenanthrene-1-carbonitrile in 40 parts of dimethylformamide is stirred for 2 hours with a solution of 4.55 parts of bromine in 25 parts of dimethylformamide and the mixture is then allowed to stand at room temperature for 4 days. When the reaction mixture is diluted with water, 1,4a-dimethyl-6 - (α - bromobutyryl) - 7 - isopropyl - 1,2,3,4,4a,9,10,-10a - octahydrophrenanthrene - 1 - carbonitrile precipitates from solution. This product is collected and washed. It has the structural formula

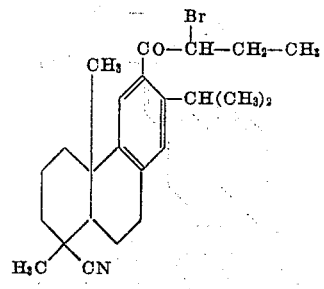

Example 9

A solution prepared from 6 parts of 1,4a-dimethyl-6-(α - bromobutyryl) - 7 - isopropyl - 1,2,3,4,4a,9,10,10a - octahydrophenanthrene-1-carbonitrile, 4.5 parts of sodium propionate, 48 parts of ethanol, 5 parts of water, and 1 part of propionic acid is heated under reflux for 6 hours and allowed to stand at room temperature for 14 hours. The reaction mixture is concentrated by distillation, diluted with water and chilled. The precipitated product is collected and washed with water. Recrystallization of this crude product from aqueous methanol yields 1,4a-dimethyl - 6 - (α - propionoxybutyryl) - 7 - isopropyl - 1,2,3,4,4a,9,10,10a - octahydrophenanthrene - 1 - carbonitrile. This compound has the following structural formula

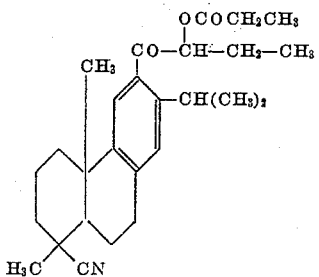

What is claimed is:
1. A compound having the structural formula

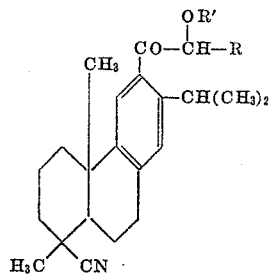

wherein R is a member of the group consisting of hydrogen and lower alkyl radicals and R' is a member of the group consisting of hydrogen and acyl radicals of lower alkanoic acids containing fewer than 9 carbon atoms.

2. A compound having the structural formula

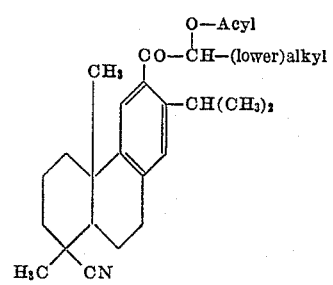

wherein the acyl radical is the acyl radical of a lower alkanoic acid containing fewer than 9 carbon atoms.

3. A compound having the structural formula

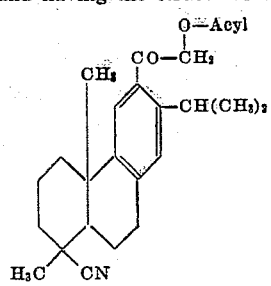

wherein the acyl radical is the acyl radical of a lower alkanoid acid containing fewer than 9 carbon atoms.

4. 1,4a - dimethyl - 6 - acetoxyacetyl - 7 - isopropyl - 1,2,3,4,4a,9,10,10a-octahydrophenanthrene-1-carbonitrile.

5. 1,4a - dimethyl - 6 - hydroxyacetyl - 7 - isopropyl - 1,2,3,4,4a,9,10,10a-octahydrophenanthrene-1-carbonitrile.

6. In a process for the manufacture of a compound having the structural formula

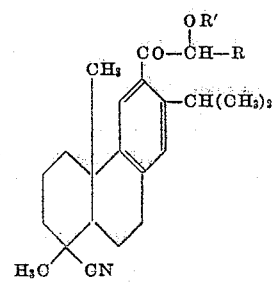

wherein R is a member of the group consisting of hydrogen and lower alkyl radicals and R' is a member of the group consisting of hydrogen and acyl radicals of lower alkanoic acids containing fewer than 9 carbon atoms, the step which comprises heating a solution of a compound having the structural formula

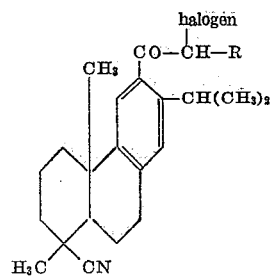

wherein halogen represents a halogen of atomic number greater than 9 and R is defined as hereinbefore, with a metal acylate having the formula Acyl-O-M wherein the acyl radical is the acyl radical of a lower alkanoic acid containing fewer than 9 carbon atoms and M is an alkali metal.

References Cited in the file of this patent
UNITED STATES PATENTS

| | | |
|---|---|---|
| 2,461,349 | Ralston et al. | Feb. 8, 1949 |
| 2,704,283 | Jacobsen | Mar. 15, 1955 |